US012803902B2

(12) United States Patent
Egea et al.

(10) Patent No.: US 12,803,902 B2
(45) Date of Patent: Nov. 17, 2026

(54) SYSTEMS AND METHODS FOR AUTOMATIC TRAFFIC ROUTING

(71) Applicant: Capital One Services, LLC, McLean, VA (US)

(72) Inventors: Christina Marie Egea, Washington, DC (US); Nithin Muthamparambil Satheesan, Sterling, VA (US); Pradosh Sivadoss, Broadlands, VA (US); Maruthi Kunnuru, Herndon, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 381 days.

(21) Appl. No.: 18/509,199

(22) Filed: Nov. 14, 2023

(65) Prior Publication Data

US 2025/0158921 A1 May 15, 2025

(51) Int. Cl.

| | |
|---|---|
| ***H04L 12/66*** | (2006.01) |
| ***H04L 45/00*** | (2022.01) |
| ***H04L 45/28*** | (2022.01) |
| ***H04L 45/302*** | (2022.01) |

(52) U.S. Cl.

CPC .......... *H04L 45/3065* (2013.01); *H04L 45/22* (2013.01); *H04L 45/28* (2013.01)

(58) Field of Classification Search

CPC ..... H04L 67/10; H04L 63/0272; H04L 69/16; H04L 47/2483; H04L 43/16; H04L 67/535; H04L 67/12; H04L 41/22; H04L 43/0876; H04L 43/08; H04L 41/5009; H04L 41/16; G06F 3/067; G06F 3/0635; G06F 11/3409; G06F 11/3006; G06F 11/302; G06F 2201/865; G06F 9/45533; G06F 11/34

See application file for complete search history.

(56) References Cited

U.S. PATENT DOCUMENTS

| | | | | |
|---|---|---|---|---|
| 6,798,743 | B1 | 9/2004 | Ma et al. | |
| 8,144,593 | B2 | 3/2012 | Narayanan et al. | |
| 9,286,413 | B1 * | 3/2016 | Coates | G06F 16/903 |
| 10,560,353 | B1 * | 2/2020 | Stickle | G06F 11/3409 |

(Continued)

OTHER PUBLICATIONS

Extended European Search Report in related EP Application No. 24210231.7, mailed Apr. 1, 2025.

(Continued)

*Primary Examiner* — Kharye Pope

(74) *Attorney, Agent, or Firm* — TROUTMAN PEPPER LOCKE LLP; Christopher J. Forstner; John A. Morrissett

(57) ABSTRACT

Disclosed embodiments may include a system for automatic traffic routing. The system may receive data associated with an application, and may assign a first portion of application traffic to be routed to a new stack, and a second portion of the application traffic to be routed to a previous stack. The system may continuously monitor the application traffic by utilizing a plurality of monitoring systems. The system may utilize a machine learning model (MLM) to iteratively transmit one or more respective monitoring queries to each of the plurality of monitoring systems, and determine whether an aspect of a monitoring query exceeds a threshold. Responsive to such determination, the system may assign a third portion of the application traffic to be routed to the new stack, and a fourth portion of the application traffic to be routed to the previous stack.

20 Claims, 3 Drawing Sheets

(56) References Cited

U.S. PATENT DOCUMENTS

| | | | | |
|---|---|---|---|---|
| 11,392,605 | B1 * | 7/2022 | Baskaran | G06F 16/254 |
| 2013/0073542 | A1 * | 3/2013 | Zhang | G06F 16/90328 707/723 |
| 2013/0326620 | A1 * | 12/2013 | Merza | H04L 63/1416 726/22 |
| 2014/0079207 | A1 * | 3/2014 | Zhakov | H04M 3/5233 379/265.03 |
| 2014/0379901 | A1 | 12/2014 | Tseitlin et al. | |
| 2016/0103665 | A1 * | 4/2016 | Liu | G06F 11/3082 717/158 |
| 2019/0332554 | A1 * | 10/2019 | O'Neill | G06F 13/1668 |
| 2020/0112487 | A1 | 4/2020 | Inamdar et al. | |
| 2023/0090607 | A1 * | 3/2023 | Popelka | G06Q 10/06 709/219 |
| 2023/0205586 | A1 | 6/2023 | Mathew et al. | |
| 2024/0202190 | A1 * | 6/2024 | Muenkel | G06F 16/2433 |

OTHER PUBLICATIONS

AWS Cloud Formation User Guide, "Monitor and roll back stack operations," accessed via https://docs.aws.amazon.com/AWSCloudFormation/latest/UserGuide/using-cfn-rollback-triggers.html (last accessed Feb. 21, 2023).

* cited by examiner

SYSTEMS AND METHODS FOR AUTOMATIC TRAFFIC ROUTING

FIELD

The disclosed technology relates to systems and methods for automatic traffic routing. Specifically, this disclosed technology relates to iteratively modifying application or service traffic flows based on various thresholds.

BACKGROUND

Traditional systems and methods for application or service traffic routing typically involve monitoring traffic flow to new versus old or previous stacks, or versions of the applicable application or service. These systems and methods may be configured to identify issues in traffic flow directed to the new stack based on one or more error thresholds, and may divert traffic flow back to an old or previous stack based on identifying those issues.

Accordingly, there is a need for improved systems and methods for automatic traffic routing. Embodiments of the present disclosure may be directed to this and other considerations.

SUMMARY

Disclosed embodiments may include a system for automatic traffic routing. The system may include one or more processors, and a memory in communication with the one or more processors and storing instructions that, when executed by the one or more processors, are configured to cause the system to conduct automatic traffic routing. The system may receive data associated with an application. Responsive to receiving the data, the system may assign a first portion of application traffic to be routed to a new stack, and a second portion of the application traffic to be routed to a previous stack. The system may continuously monitor the application traffic by utilizing a plurality of monitoring systems. The system may utilize a machine learning model (MLM) to iteratively: transmit one or more respective monitoring queries to each of the plurality of monitoring systems, and determine whether at least one aspect of a first monitoring query of the one or more respective monitoring queries exceeds a threshold. Responsive to determining that the at least one aspect of the first monitoring query does not exceed the threshold, system may assign a third portion of the application traffic to be routed to the new stack by modifying the first portion of the application traffic, and may assign a fourth portion of the application traffic to be routed to the previous stack by modifying the second portion of the application traffic.

Disclosed embodiments may include a system for automatic traffic routing. The system may include one or more processors, and a memory in communication with the one or more processors and storing instructions that, when executed by the one or more processors, are configured to cause the system to conduct automatic traffic routing. The system may assign a first portion of application traffic to be routed to a new stack, and a second portion of the application traffic to be routed to a previous stack. The system may continuously monitor the application traffic by utilizing a plurality of monitoring systems. The system may utilize an MLM to iteratively: transmit one or more respective monitoring queries to each of the plurality of monitoring systems, and determine whether at least one aspect of a first monitoring query of the one or more respective monitoring queries exceeds a threshold. Responsive to determining that the at least one aspect of the first monitoring query does not exceed the threshold, the system may assign a third portion of the application traffic to be routed to the new stack by modifying the first portion of the application traffic, and may assign a fourth portion of the application traffic to be routed to the previous stack by modifying the second portion of the application traffic.

Disclosed embodiments may include a system for automatic traffic routing. The system may include one or more processors, and a memory in communication with the one or more processors and storing instructions that, when executed by the one or more processors, are configured to cause the system to conduct automatic traffic routing. The system may assign a first portion of application traffic to be routed to a new stack. The system may continuously monitor the application traffic by utilizing one or more monitoring systems. The system may utilize an MLM to iteratively: transmit one or more respective monitoring queries to each of the one or more monitoring systems, and determine whether at least one aspect of a first monitoring query of the one or more respective monitoring queries exceeds a threshold. Responsive to determining that the at least one aspect of the first monitoring query does not exceed the threshold, the system may assign a second portion of the application traffic to be routed to the new stack by modifying the first portion of the application traffic.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
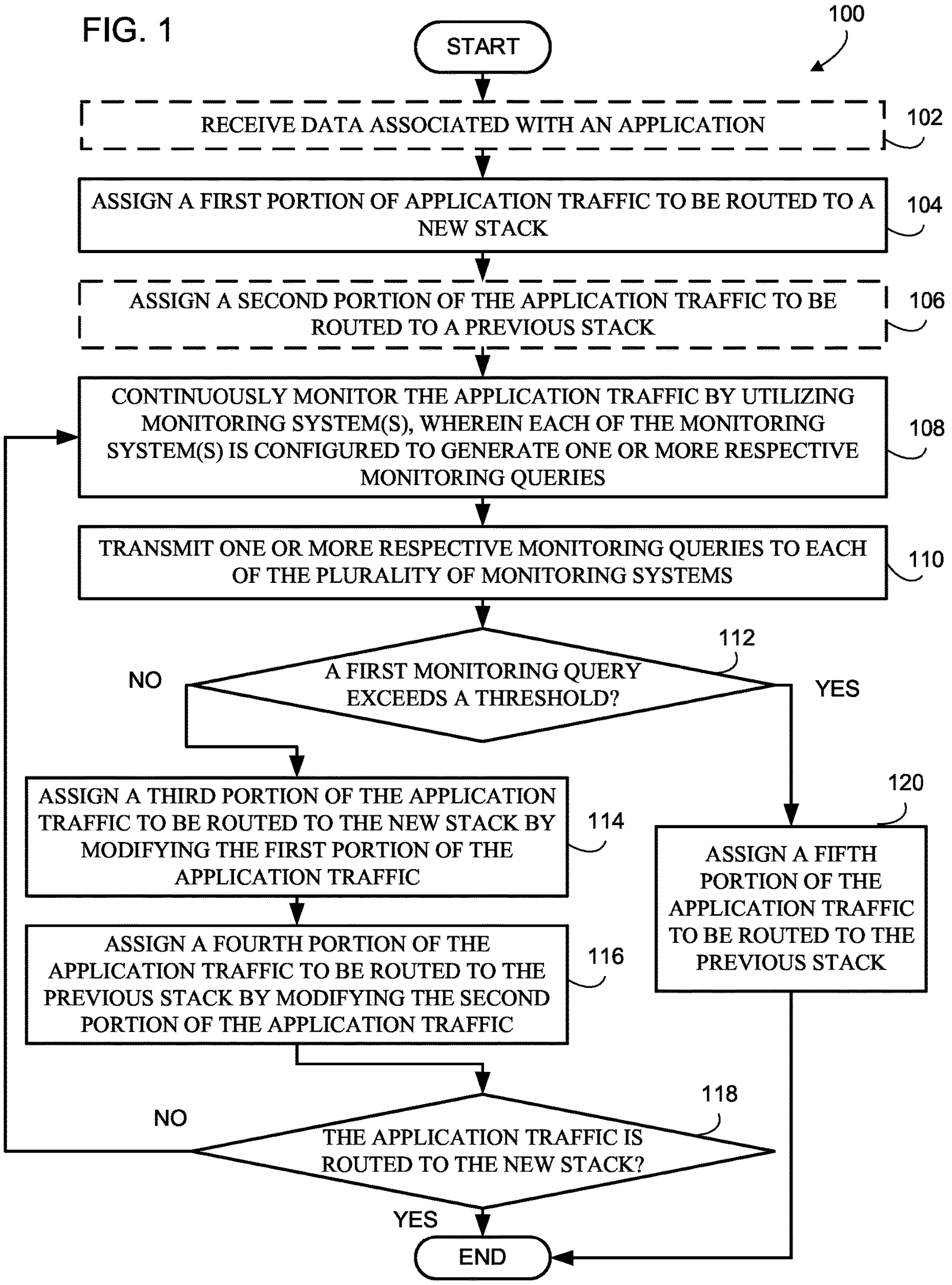
FIG. 1 is a flow diagram illustrating an exemplary method for conducting automatic traffic routing, in accordance with certain embodiments of the disclosed technology.

Traditional systems and methods for application or service traffic routing typically involve monitoring traffic flow to new versus old or previous stacks, or versions of the applicable application or service. These systems and methods may be configured to identify issues in traffic flow directed to the new stack based on one or more error thresholds, and may divert traffic flow back to an old or previous stack based on identifying those issues. These systems and methods, however, may typically utilize only a single monitoring system for identifying issues in traffic flow, and hence may result in downtime or decreased efficiency when the monitoring system experiences operating or functionality issues. Additionally, these systems and methods typically include a limited number and/or type of error thresholds in determining whether to modify traffic flows, and typically do not provide for monitoring client impact as part of the overall process.

Accordingly, examples of the present disclosure may provide for assigning initial portions of traffic flow to be routed to new and previous stacks; continuously monitoring the traffic flows using a plurality of monitoring systems, each configured to generate one or more respective monitoring queries; iteratively determining whether at least one aspect of a monitoring query has exceeded an applicable threshold; and responsive to making such determination, modifying the initial portions of traffic flow to the new and previous stacks.

Disclosed embodiments may employ MLMs, among other computerized techniques, to aid in adjusting traffic flows based on determining that at least one aspect of a monitoring query has exceeded a threshold. Machine learning models are a unique computer technology that involves training models to complete tasks and make decisions. These techniques may help to improve database and network operations. For example, the systems and methods described herein may utilize, in some instances, MLMs, which are necessarily rooted in computers and technology, to iteratively determine whether at least one aspect of any monitoring query has exceeded a threshold, and to modify traffic flows to previous and new application stacks based on such determination. This, in some examples, may involve using system- and application- or service-specific input data and an MLM, applied to determine whether traffic flows require adjusting. Using an MLM and a computer system configured in this way may allow the system to provide iterative modifying of traffic flows such that the system may eventually achieve full traffic flow routed to a new stack.

This may provide an advantage and improvement over prior technologies that may not be configured to utilize multiple monitoring systems or to automatically adjust traffic flows based on a variety of thresholds, including client impact. The present disclosure solves this problem by training models to evaluate system- and application- or service-specific input data to arrive at a decision as to what portions of overall traffic flow should be routed to new versus old or previous stacks. Furthermore, examples of the present disclosure may also improve the speed with which computers can conduct automatic traffic routing. Overall, the systems and methods disclosed have significant practical applications in the traffic routing field because of the noteworthy improvements of iterative adjustment and client impact evaluation, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for conducting automatic traffic routing, in accordance with certain embodiments of the disclosed technology. The steps of method 100 may be performed by one or more components of the system 300 (e.g., route modification system 220, web server 310 of traffic routing system 308, and/or user device 302), as described in more detail with respect to FIGS. 2 and 3. While certain blocks may be identified as being optional, certain embodiments may omit blocks even if they are not necessarily identified as being optional.

In optional block 102, the route modification system 220 may receive data associated with an application. For example, the system may receive data corresponding to the operation or functionality of the application, such as, average traffic volume, usage rates, applicable versions and/or updates, and the like. For purposes of this disclosure, "application" may include any web service that services web requests.

In block 104, responsive to receiving the data, the route modification system 220 may assign a first portion of application traffic to be routed to a new stack. In some embodiments, the first portion may be a specific amount or percentage of the overall traffic flow routed to the new application stack. In some embodiments, the system may be configured to utilize an MLM to determine or predict an appropriate initial amount or portion of traffic flow that should be routed to the new stack based on, for example, the received data (block 102), monitoring of live traffic flow to the application, historical data (e.g., associated with operation) of the application or other similar applications, and the like. In some embodiments, the system may receive, via a GUI (e.g., via a programmed configuration file), user input associated with the application, and may assign the first and/or second portion of application traffic based on the user input.

In optional block 106, responsive to receiving the data, the route modification system 220 may assign a second portion of the application traffic to be routed to a previous stack. This step may be the same as or similar to block 104, discussed above, except that the second portion of application traffic is to be routed to an old or previous application stack rather than the new stack. In some embodiments, the second portion may include the remaining portion of application traffic after the first portion has been assigned (block 104). For example, if 5% of application traffic was assigned to the new stack (block 104), 95% of application traffic may be assigned to the old stack.

In block 108, the route modification system 220 may continuously monitor the application traffic by utilizing a plurality of monitoring systems. In some embodiments, the system may be configured to rely on the monitoring systems in a modular fashion. For example, the system may begin by utilizing two monitoring systems and comparing results between the two systems. The system may bring in additional monitoring systems to have the capability of monitoring the application traffic flow for different respective thresholds of each monitoring system, as further discussed below.

In some embodiments, the system may be configured to utilize an MLM to iteratively determine whether a first monitoring system of the plurality of monitoring systems is not functioning. Responsive to making such determination, the system may segregate the first monitoring system from the remaining monitoring functions. A benefit of this feature is that it may enable the system to provide backup, additional, and/or varied monitoring to aid in maintaining overall system efficiency and reliability.

In block 110, the route modification system 220 may utilize an MLM to iteratively transmit one or more respective monitoring queries to each of the plurality of monitoring systems. According to some embodiments, the iterative process initiated in block 110 may be executed until the application traffic is routed to the new stack. In some embodiments, the one or more respective monitoring queries may be unique to each monitoring system and may be configured to request the monitoring system provide a response as to whether the applicable monitoring system is experiencing any issues, e.g., if one or more aspects of a specific respective query exceeds a corresponding threshold, as further discussed below.

In block 112, the route modification system 220 may determine whether at least one aspect of a first monitoring query of the one or more respective monitoring queries exceeds a threshold. In some embodiments, the system may make such determination by receiving a response from an applicable monitoring system, as discussed above. In some embodiments, the system may be configured to receive data from the plurality of monitoring systems, the data itself providing the system, e.g., via the MLM, with indications as to whether at least one aspect of a particular query has exceeded a respective threshold.

In some embodiments, an aspect of a monitoring query may include an error count, for example, based on a volume of service associated with the application. For example, an application having a higher volume of service may be associated with a higher tolerance in terms of the number of errors the system may accept before modifying the traffic flows, as further discussed below. Thus, in some embodiments, the threshold may include an error count threshold.

In some embodiments, an aspect of a monitoring query may include a health status. The health status may correspond to how efficiently and/or accurately the application is currently handling live traffic flow, whether to the new or old stack. In some embodiments, the health status may be a rating on a scale, e.g., of 0-10. The respective monitoring system and/or the MLM may be configured to receive data associated with the application and/or traffic flow current conditions, and to rate the current health status on the corresponding scale. Thus, in some embodiments, the threshold may include a health status threshold.

In some embodiments, an aspect of a monitoring query may include a response time, e.g., a traffic timeout, which may include an amount of time elapsed before a portion of traffic is routed to the new stack, or a maximum amount of time the system may be configured to wait for traffic to be routed to the new stack. For example, after the system has assigned and/or modified the traffic flow routed to the new stack, as discussed herein, the system may be configured to determine whether that portion (e.g., percent) of traffic flow, or a predefined amount of that portion of traffic flow, has been successfully routed to the new stack. Should the system identify this response time has passed before the portion (or predetermined amount) of traffic flow has been successfully routed to the new stack, the system may modify the traffic flows routed to the new and/or old stacks, as further discussed below. Thus, in some embodiments, the threshold may include a response time threshold.

In some embodiments, an aspect of a monitoring query may include a stage duration, which may correspond to a period of time during which a number of errors are received. For example, the system may be configured to monitor a number of errors received by the monitoring system(s) on a periodic basis, such as every one minute period, or on an aggregated basis, such as a predetermined total length of time. Whether monitoring errors on a periodic or aggregated basis, the system may be configured to modify the traffic flows to the new and old stacks, as further discussed below, if the number of errors exceeds a predetermined number within the monitored time frame. Thus, in some embodiments, the threshold may include a stage duration threshold.

In some embodiments, the system may be configured to monitor the above-described aspects and/or other types of aspects in relation to one or more corresponding thresholds to evaluate client impact associated with changing traffic flows, as discussed herein. For example, the system may be configured to continuously monitor the application traffic for signs that an end-user of the new application stack (e.g., a new version of the application) might be negatively impacted, such as by experiencing errors, down time, reduced speeds, etc. In some embodiments, the system may be configured to classify negative client impact as a binary decision, for example, if the end-user experiences any amount or type of error, down time, etc., in operating the new application stack, the system may adjust the traffic flows to the new and/or old stacks, as discussed herein. In some embodiments, the system may be configured to classify negative client impact as a non-binary decision, for example, by utilizing an MLM to determine whether a tolerance for negative client impact has been met based on the specific features of the application being monitored, overall traffic volumes, historical data, etc., as further discussed herein.

In block 114, responsive to determining that the at least one aspect of the first monitoring query does not exceed the threshold, the route modification system 220 may assign a third portion of the application traffic to be routed to the new stack by modifying the first portion of the application traffic. In some embodiments, modifying the first portion of the application traffic may include increasing the first portion. For example, the system may have begun monitoring application traffic flow by assigning 25 percent of the overall traffic flow to the new stack. Upon determining that an aspect of a monitoring query does not exceed a respective threshold, as discussed above, the system may modify or adjust the 25 percent up to 50 percent, and then continue monitoring the traffic flows to identify whether this adjustment helped the efficiency, reliability, operation, etc., of the new application stack, and/or how this adjustment influenced client impact, as discussed above.

In block 116, responsive to determining that the at least one aspect of the first monitoring query does not exceed the threshold, the route modification system 220 may assign a fourth portion of the application traffic to be routed to the previous stack by modifying the second portion of the application traffic. This step may be the same as or similar to block 114, discussed above, except that modifying the second portion of the application traffic may include decreasing the second portion.

In block 118, the route modification system 220 may determine whether the application traffic is routed to the new stack. For example, throughout the process of continuously monitoring the application traffic flow, and iteratively adjusting traffic flow portions to the new and/or old stacks, as discussed above, the system may be configured to determine when the entirety of the application traffic associated with the application has been successfully routed to the new stack. In some embodiments, once the system makes such determination, the system may be configured to cease monitoring this particular application as all associated traffic has now been successfully routed to the new stack. In some embodiments, once the system makes such determination, the system may be configured to continue monitoring traffic associated with this particular application for a period of time, for example, a warranty period.

In block 120, responsive to determining that the at least one aspect of the first monitoring query exceeds the threshold, the route modification system 220 may assign a fifth portion of the application traffic to be routed to the previous stack, such as by modifying the first and/or second portions of application traffic (blocks 104, 106). In some embodiments, the fifth portion may be the entirety of the application traffic flow such that all traffic flowing to a specific application—upon determining that the at least one aspect of the first monitoring query exceeds the threshold—may be routed to the previous stack. In some embodiments, the fifth portion may be an increased portion of application traffic compared to the second portion (block 106). For example, if the system initially assigned 25 percent of application traffic to be routed to the new stack (block 104), and/or assigned 75 percent of application traffic to be routed to the previous stack (block 106), the system—upon determining that the at least one aspect of the first monitoring query exceeds the threshold—may increase the application traffic routed to the previous stack from 75 percent to 90 percent, thereby reducing the application traffic routed to the new stack from 25 percent to 10 percent. A benefit of such feature is that if the system determines any issue(s) with the new stack, such as via client impact (as discussed herein), the system may re-adjust the percentages of application traffic routed to the previous and/or new stacks such that a higher amount of traffic is routed back to the previous stack.

Figure 2:
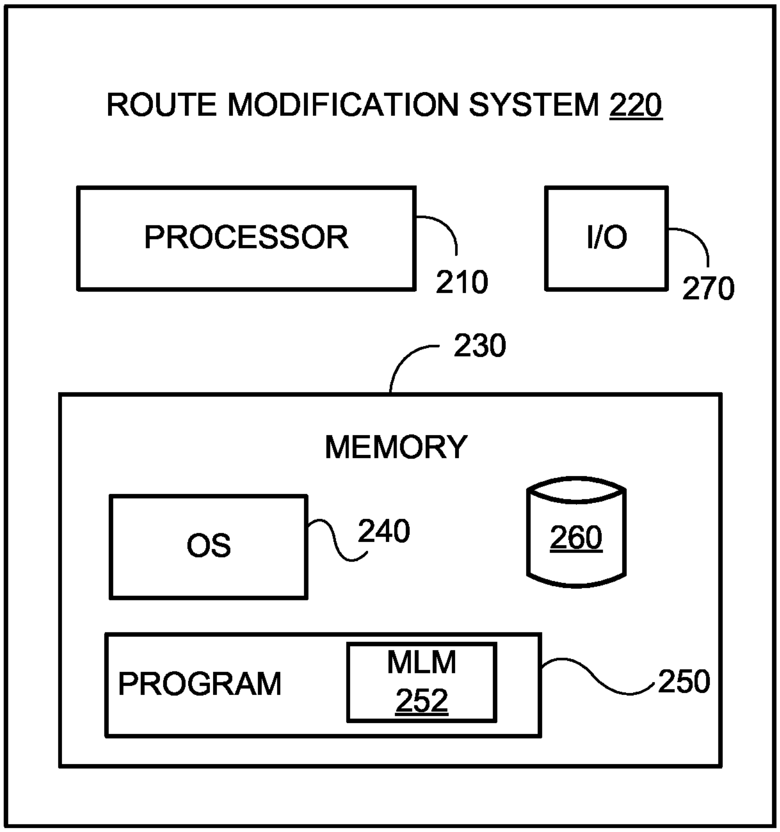
FIG. 2 is a block diagram of an example route modification system used to conduct automatic traffic routing, according to an example implementation of the disclosed technology.
Figure 3:
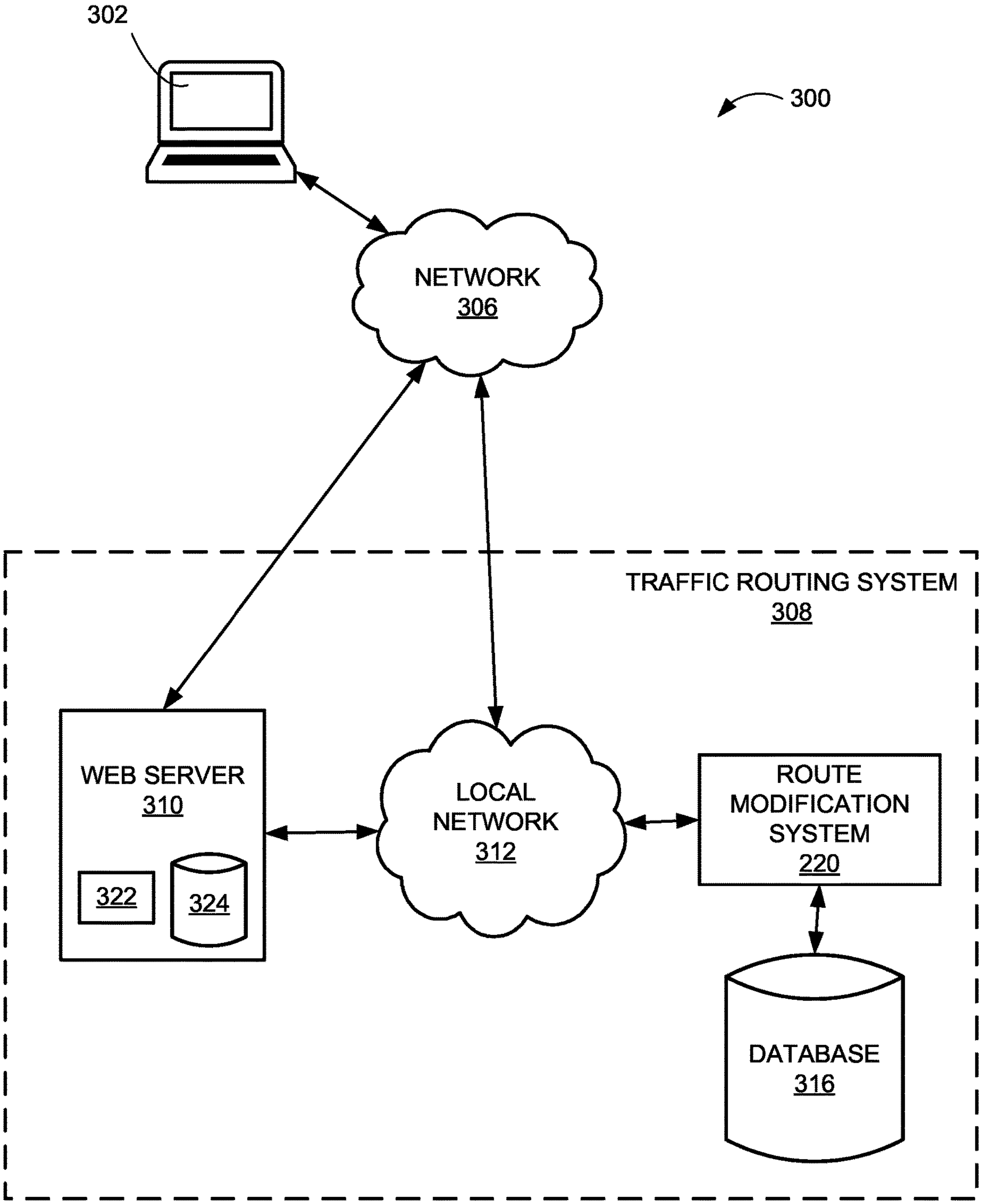
FIG. 3 is a block diagram of an example system that may be used to conduct automatic traffic routing, according to an example implementation of the disclosed technology.

FIG. 2 is a block diagram of an example route modification system 220 used to conduct automatic traffic routing, according to an example implementation of the disclosed technology. According to some embodiments, the user device 302, and web server 310, as depicted in FIG. 3 and described below, may have a similar structure and components that are similar to those described with respect to route modification system 220 shown in FIG. 2. As shown, the route modification system 220 may include a processor 210, an input/output (I/O) device 270, a memory 230 containing an operating system (OS) 240 and a program 250. In some embodiments, program 250 may include an MLM 252 that may be trained, for example, to iteratively determine whether one or more aspects of any monitoring query have exceeded a threshold, and to modify traffic flows to previous and new application stacks based on such determination. In certain implementations, MLM 252 may issue commands in response to processing an event, in accordance with a model that may be continuously or intermittently updated. Moreover, processor 210 may execute one or more programs (such as via a rules-based platform or the trained MLM 252), that, when executed, perform functions related to disclosed embodiments.

In certain example implementations, the route modification system 220 may be a single server or may be configured as a distributed computer system including multiple servers or computers that interoperate to perform one or more of the processes and functionalities associated with the disclosed embodiments. In some embodiments route modification system 220 may be one or more servers from a serverless or scaling server system. In some embodiments, the route modification system 220 may further include a peripheral interface, a transceiver, a mobile network interface in communication with the processor 210, a bus configured to facilitate communication between the various components of the route modification system 220, and a power source configured to power one or more components of the route modification system 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: radio-frequency identification (RFID), NFC, Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 210 may be a single core processor that is configured with virtual processing technologies. In certain embodiments, the processor 210 may use logical processors to simultaneously execute and control multiple processes. The processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the route modification system 220 may include one or more storage devices configured to store information used by the processor 210 (or other components) to perform certain functions related to the disclosed embodiments. In one example, the route modification system 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The route modification system 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the route modification system 220 may include the memory 230 that may include one or more programs 250 to perform one or more functions of the disclosed embodiments. For example, in some embodiments, the route modification system 220 may additionally manage dialogue and/or other interactions with the customer via a program 250.

The processor 210 may execute one or more programs 250 located remotely from the route modification system 220. For example, the route modification system 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a database 260 for storing related data to enable the route modification system 220 to perform one or more of the processes and functionalities associated with the disclosed embodiments.

The database 260 may include stored data relating to status data (e.g., average session duration data, location data, idle time between sessions, and/or average idle time between sessions) and historical status data. According to some embodiments, the functions provided by the database 260 may also be provided by a database that is external to the route modification system 220, such as the database 316 as shown in FIG. 3.

The route modification system 220 may also be communicatively connected to one or more memory devices (e.g., databases) locally or through a network. The remote memory devices may be configured to store information and may be accessed and/or managed by the route modification system 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The route modification system 220 may also include one or more I/O devices 270 that may comprise one or more interfaces for receiving signals or input from devices and providing signals or output to one or more devices that allow data to be received and/or transmitted by the route modification system 220. For example, the route modification system 220 may include interface components, which may provide interfaces to one or more input devices, such as one or more keyboards, mouse devices, touch screens, track pads, trackballs, scroll wheels, digital cameras, microphones, sensors, and the like, that enable the route modification system 220 to receive data from a user (such as, for example, via the user device 302).

In examples of the disclosed technology, the route modification system 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The route modification system 220 may contain programs that train, implement, store, receive, retrieve, and/or transmit one or more MLMs. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The route modification system 220 may be configured to adjust model parameters during training. Model parameters may include weights, coefficients, offsets, or the like. Training may be supervised or unsupervised.

The route modification system 220 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The route modification system 220 may be configured to optimize statistical models using known optimization techniques.

Furthermore, the route modification system 220 may include programs configured to retrieve, store, and/or analyze properties of data models and datasets. For example, route modification system 220 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The route modification system 220 may include algorithms to determine a data type, key-value pairs, row-column data structure, statistical distributions of information such as keys or values, or other property of a data schema may be configured to return a statistical profile of a dataset (e.g., using a data-profiling model). The route modification system 220 may be configured to implement univariate and multivariate statistical methods. The route modification system 220 may include a regression model, a Bayesian model, a statistical model, a linear discriminant analysis model, or other classification model configured to determine one or more descriptive metrics of a dataset. For example, route modification system 220 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The route modification system 220 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, route modification system 220 may be configured to generate a similarity metric representing a measure of similarity between data in a dataset. A similarity metric may be based on a correlation, covariance matrix, a variance, a frequency of overlapping values, or other measure of statistical similarity.

The route modification system 220 may be configured to generate a similarity metric based on data model output, including data model output representing a property of the data model. For example, route modification system 220 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The route modification system 220 may be configured to classify a dataset. Classifying a dataset may include determining whether a dataset is related to another dataset. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The route modification system 220 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, route modification system 220 is configured to generate and/or train a classification model to classify a dataset, consistent with disclosed embodiments.

The route modification system 220 may also contain one or more prediction models.

Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via one or more weighted connections. Prediction models may additionally or alternatively include classification and regression trees, or other types of models known to those skilled in the art. To generate prediction models, the asset detection system may analyze information applying machine-learning methods.

While the route modification system 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the route modification system 220 may include a greater or lesser number of components than those illustrated.

FIG. 3 is a block diagram of an example system that may be used to view and interact with traffic routing system 308, according to an example implementation of the disclosed technology. The components and arrangements shown in FIG. 3 are not intended to limit the disclosed embodiments as the components used to implement the disclosed processes and features may vary. As shown, traffic routing system 308 may interact with a user device 302 via a network 306. In certain example implementations, the traffic routing system 308 may include a local network 312, a route modification system 220, a web server 310, and a database 316.

In some embodiments, a respective user may operate the user device 302. The user device 302 can include one or more of a mobile device, smart phone, smart device (e.g., smart speaker), general purpose computer, tablet computer, laptop computer, telephone, public switched telephone network (PSTN) landline, smart wearable device, voice command device, other mobile computing device, or any other device capable of communicating with the network 306 and ultimately communicating with one or more components of the traffic routing system 308. In some embodiments, the user device 302 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the traffic routing system 308. According to some embodiments, the user device 302 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The route modification system 220 may include programs (scripts, functions, algorithms) to configure data for visualizations and provide visualizations of datasets and data models on the user device 302. This may include programs to generate graphs and display graphs. The route modification system 220 may include programs to generate histograms, scatter plots, time series, or the like on the user device 302. The route modification system 220 may also be configured to display properties of data models and data model training results including, for example, architecture, loss functions, cross entropy, activation function values, embedding layer structure and/or outputs, convolution results, node outputs, or the like on the user device 302.

The network 306 may be of any suitable type, including individual connections via the internet such as cellular or WiFi networks. In some embodiments, the network 306 may connect terminals, services, and mobile devices using direct connections such as RFID, NFC, Bluetooth™. BLE, WiFi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 306 may include any type of computer networking arrangement used to exchange data. For example, the network 306 may be the Internet, a private data network, virtual private network (VPN) using a public network, and/or other suitable connection(s) that enable(s) components in the system 300 environment to send and receive information between the components of the system 300. The network 306 may also include a PSTN and/or a wireless network.

The traffic routing system 308 may be associated with and optionally controlled by one or more entities such as a business, corporation, individual, partnership, or any other entity that provides one or more of goods, services, and consultations to individuals such as customers. In some embodiments, the traffic routing system 308 may be controlled by a third party on behalf of another business, corporation, individual, partnership, etc., The traffic routing system 308 may include one or more servers and computer systems for performing one or more functions associated with products and/or services that the organization provides.

Web server 310 may include a computer system configured to generate and provide one or more websites accessible to customers, as well as any other individuals involved in accessing traffic routing system 308's normal operations. Web server 310 may include a computer system configured to receive communications from user device 302 via for example, a mobile application, a chat program, an instant messaging program, a voice-to-text program, an SMS message, email, or any other type or format of written or electronic communication. Web server 310 may have one or more processors 322 and one or more web server databases 324, which may be any suitable repository of website data. Information stored in web server 310 may be accessed (e.g., retrieved, updated, and added to) via local network 312 and/or network 306 by one or more devices or systems of system 300. In some embodiments, web server 310 may host websites or applications that may be accessed by the user device 302. For example, web server 310 may host a financial service provider website that a user device may access by providing an attempted login that is authenticated by the route modification system 220. According to some embodiments, web server 310 may include software tools, similar to those described with respect to user device 302 above, that may allow web server 310 to obtain network identification data from user device 302. The web server may also be hosted by an online provider of website hosting, networking, cloud, or backup services, such as Microsoft Azure™ or Amazon Web Services™.

The local network 312 may include any type of computer networking arrangement used to exchange data in a localized area, such as WiFi, Bluetooth™, Ethernet, and other suitable network connections that enable components of the traffic routing system 308 to interact with one another and to connect to the network 306 for interacting with components in the system 300 environment. In some embodiments, the local network 312 may include an interface for communicating with or linking to the network 306. In other embodiments, certain components of the traffic routing system 308 may communicate via the network 306, without a separate local network 306.

The traffic routing system 308 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 302 may be able to access traffic routing system 308 using the cloud computing environment. User device 302 may be able to access traffic routing system 308 using specialized software. The cloud computing environment may eliminate the need to install specialized software on user device 302.

In accordance with certain example implementations of the disclosed technology, the traffic routing system 308 may include one or more computer systems configured to compile data from a plurality of sources, such as the route modification system 220, web server 310, and/or the database 316. The route modification system 220 may correlate compiled data, analyze the compiled data, arrange the compiled data, generate derived data based on the compiled data, and store the compiled and derived data in a database such as the database 316. According to some embodiments, the database 316 may be a database associated with an organization and/or a related entity that stores a variety of information relating to customers, transactions, ATM, and business operations. The database 316 may also serve as a back-up storage device and may contain data and information that is also stored on, for example, database 260, as discussed with reference to FIG. 2.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Example Use Case

The following example use case describes examples of a typical user flow pattern. This section is intended solely for explanatory purposes and not in limitation.

In one example, an organization may intend to roll out a new version of an application or service to their customer base. The organization may own and/or operate a system configured to aid in successfully rolling out the new version, e.g., traffic routing system 308. The system may be configured to receive operational data associated with the application. Based on the operational data, and initial traffic flow data associated with other similar applications, the system may utilize an MLM to determine and assign an initial percent of application traffic flow to be routed to the new version and a previous version of the application. The system may rely on a plurality of different monitoring systems each configured to monitor the new and previous application version traffic flows, and to bring in data associated with those traffic flows, such as whether the system identifies any errors, elevated response times, etc., within the new and previous application versions. The system may further utilize an MLM configured to receive the data from the monitoring systems, and iteratively adjust or modify the percent of application traffic flow routed to the new and previous versions based on determining whether one or more aspects of certain queries sent to the monitoring systems exceed respective thresholds. For example, if the MLM determines a number of errors experienced by end-users of the new application version exceeds a specific number over a predetermined period of time, the system may reduce the percent of traffic flow routed to the new version, and increase the percent traffic flow routed to the previous version. The system may continuously monitor these newly assigned traffic flows until the system determines that all application traffic has been successfully routed to the new version of the application.

Clause 1: A system for automatic traffic routing, the system comprising: one or more processors; and memory in communication with the one or more processors and storing instructions that, when executed by the one or more processors, are configured to cause the system to: receive data associated with an application; responsive to receiving the data, assign a first portion of application traffic to be routed to a new stack, and a second portion of the application traffic to be routed to a previous stack; continuously monitor the application traffic by utilizing a plurality of monitoring systems; and utilize a machine learning model (MLM) to iteratively: transmit one or more respective monitoring queries to each of the plurality of monitoring systems; determine whether at least one aspect of a first monitoring query of the one or more respective monitoring queries exceeds a threshold; and responsive to determining that the at least one aspect of the first monitoring query does not exceed the threshold: assign a third portion of the application traffic to be routed to the new stack by modifying the first portion of the application traffic; and assign a fourth portion of the application traffic to be routed to the previous stack by modifying the second portion of the application traffic.

Clause 2: The system of clause 1, wherein the data comprises one or more operational features of the application.

Clause 3: The system of clause 1, wherein the instructions are further configured to cause the system to: receive, via a graphical user interface (GUI), user input associated with the application, wherein assigning the first portion and second portion of the application traffic is further responsive to receiving the user input.

Clause 4: The system of clause 1, wherein the instructions are further configured to cause the system to: utilize the MLM to iteratively: determine whether a first monitoring system of the plurality of monitoring systems is not functioning; and responsive to determining the first monitoring system is not functioning, segregate the first monitoring system from the remaining monitoring systems.

Clause 5: The system of clause 1, wherein: modifying the first portion of the application traffic comprises increasing the first portion of the application traffic; and modifying the second portion of the application traffic comprises decreasing the second portion of the application traffic.

Clause 6: The system of clause 1, wherein the at least one aspect of the first monitoring query comprises one or more of an error count, a health status, a response time, a stage duration, or combinations thereof.

Clause 7: The system of clause 6, wherein the error count is based on a volume of service associated with the application.

Clause 8: The system of clause 6, wherein the response time comprises an amount of time elapsed before a portion of traffic is routed to the new stack.

Clause 9: The system of clause 6, wherein the stage duration corresponds to a period of time during which a number of errors are received.

Clause 10: A system for automatic traffic routing, the system comprising: one or more processors; and memory in communication with the one or more processors and storing instructions that, when executed by the one or more processors, are configured to cause the system to: assign a first portion of application traffic to be routed to a new stack, and a second portion of the application traffic to be routed to a previous stack; continuously monitor the application traffic by utilizing a plurality of monitoring systems; and utilize a machine learning model (MLM) to iteratively: transmit one or more respective monitoring queries to each of the plurality of monitoring systems; determine whether at least one aspect of a first monitoring query of the one or more respective monitoring queries exceeds a threshold; and responsive to determining that the at least one aspect of the first monitoring query does not exceed the threshold: assign a third portion of the application traffic to be routed to the new stack by modifying the first portion of the application traffic; and assign a fourth portion of the application traffic to be routed to the previous stack by modifying the second portion of the application traffic.

Clause 11: The system of clause 10, wherein the instructions are further configured to cause the system to: receive, via a graphical user interface (GUI), user input, wherein assigning the first portion and second portion of the application traffic is responsive to receiving the user input.

Clause 12: The system of clause 10, wherein the instructions are further configured to cause the system to: utilize the MLM to iteratively: determine whether a first monitoring system of the plurality of monitoring systems is not functioning; and responsive to determining the first monitoring system is not functioning, segregate the first monitoring system from the remaining monitoring systems.

Clause 13: The system of clause 10, wherein: modifying the first portion of the application traffic comprises increasing the first portion of the application traffic; and modifying the second portion of the application traffic comprises decreasing the second portion of the application traffic.

Clause 14: The system of clause 10, wherein the at least one aspect of the first monitoring query comprises one or more of an error count, a health status, a response time, a stage duration, or combinations thereof.

Clause 15: The system of clause 14, wherein the error count is based on a volume of service associated with an application.

Clause 16: The system of clause 14, wherein the response time comprises an amount of time elapsed before a portion of traffic is routed to the new stack.

Clause 17: The system of clause 10, wherein the instructions are further configured to cause the system to: responsive to determining that the at least one aspect of the first monitoring query exceeds the threshold, assign a fifth portion of the application traffic to be routed to the previous stack.

Clause 18: A system for automatic traffic routing, the system comprising: one or more processors; and memory in communication with the one or more processors and storing instructions that, when executed by the one or more processors, are configured to cause the system to: assign a first portion of application traffic to be routed to a new stack; continuously monitor the application traffic by utilizing one or more monitoring systems; and utilize a machine learning model (MLM) to iteratively: transmit one or more respective monitoring queries to each of the one or more monitoring systems; determine whether at least one aspect of a first monitoring query of the one or more respective monitoring queries exceeds a threshold; and responsive to determining that the at least one aspect of the first monitoring query does not exceed the threshold, assign a second portion of the application traffic to be routed to the new stack by modifying the first portion of the application traffic.

Clause 19: The system of clause 18, wherein the instructions are further configured to cause the system to: receive, via a graphical user interface (GUI), user input, wherein assigning the first portion of the application traffic is responsive to receiving the user input.

Clause 20: The system of clause 18, wherein modifying the first portion of the application traffic comprises increasing the first portion of the application traffic.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for automatic traffic routing for transitioning application traffic from a previous version of an application to a new version of the application, the system comprising:
- one or more processors; and
- memory in communication with the one or more processors and storing instructions that, when executed by the one or more processors, are configured to cause the system to:
  - receive data associated with the application;
  - responsive to receiving the data, assign a first portion of application traffic to be routed to a new stack, and a second portion of the application traffic to be routed to a previous stack;
  - continuously monitor the application traffic by utilizing a plurality of monitoring systems; and
  - utilize a machine learning model (MLM) to iteratively:
    - transmit one or more respective monitoring queries to each of the plurality of monitoring systems;
    - determine whether at least one aspect of a first monitoring query of the one or more respective monitoring queries exceeds a threshold; and
    - responsive to determining that the at least one aspect of the first monitoring query does not exceed the threshold:
      - assign a third portion of the application traffic to be routed to the new stack by modifying the first portion of the application traffic; and
      - assign a fourth portion of the application traffic to be routed to the previous stack by modifying the second portion of the application traffic;
    - determine whether the application traffic is routed to the new stack; and
    - responsive to determining that the application traffic is routed to the new stack, cease monitoring the application traffic, wherein the new stack comprises the new version of the application and the previous stack comprises the previous version of the application.

2. The system of claim 1, wherein the instructions are further configured to cause the system to:
- utilize the MLM to iteratively:
  - determine whether a first monitoring system of the plurality of monitoring systems is not functioning; and
  - responsive to determining the first monitoring system is not functioning, segregate the first monitoring system from the remaining monitoring systems.

3. The system of claim 1, wherein:
- modifying the first portion of the application traffic comprises increasing the first portion of the application traffic; and
- modifying the second portion of the application traffic comprises decreasing the second portion of the application traffic.

4. The system of claim 1, wherein the at least one aspect of the first monitoring query comprises one or more of an error count, a health status, a response time, a stage duration, or combinations thereof.

5. The system of claim 4, wherein the error count is based on a volume of service associated with the application.

6. The system of claim 4, wherein the response time comprises an amount of time elapsed before a portion of traffic is routed to the new stack.

7. The system of claim 4, wherein the stage duration corresponds to a period of time during which a number of errors are received.

8. A system for automatic traffic routing for transitioning application traffic from a previous version of an application to a new version of the application, the system comprising:
- one or more processors; and
- memory in communication with the one or more processors and storing instructions that, when executed by the one or more processors, are configured to cause the system to:
  - assign a first portion of application traffic to be routed to a new stack, and a second portion of the application traffic to be routed to a previous stack;
  - continuously monitor the application traffic by utilizing a plurality of monitoring systems; and
  - utilize a machine learning model (MLM) to iteratively:
    - transmit one or more respective monitoring queries to each of the plurality of monitoring systems;

determine whether at least one aspect of a first monitoring query of the one or more respective monitoring queries exceeds a threshold; and responsive to determining that the at least one aspect of the first monitoring query does not exceed the threshold:

assign a third portion of the application traffic to be routed to the new stack by modifying the first portion of the application traffic;

assign a fourth portion of the application traffic to be routed to the previous stack by modifying the second portion of the application traffic;

determine whether the application traffic is routed to the new stack; and responsive to determining that the application traffic is routed to the new stack, cease monitoring the application traffic, wherein the new stack comprises the new version of the application and the previous stack comprises the previous version of the application.

9. The system of claim 8, wherein the instructions are further configured to cause the system to:

receive, via a graphical user interface (GUI), user input, wherein assigning the first portion and second portion of the application traffic is responsive to receiving the user input.

10. The system of claim 8, wherein the instructions are further configured to cause the system to:

utilize the MLM to iteratively:

determine whether a first monitoring system of the plurality of monitoring systems is not functioning; and responsive to determining the first monitoring system is not functioning, segregate the first monitoring system from the remaining monitoring systems.

11. The system of claim 8, wherein:

modifying the first portion of the application traffic comprises increasing the first portion of the application traffic; and modifying the second portion of the application traffic comprises decreasing the second portion of the application traffic.

12. The system of claim 8, wherein the at least one aspect of the first monitoring query comprises one or more of an error count, a health status, a response time, a stage duration, or combinations thereof.

13. The system of claim 12, wherein the error count is based on a volume of service associated with the application.

14. The system of claim 12, wherein the response time comprises an amount of time elapsed before a portion of traffic is routed to the new stack.

15. The system of claim 8, wherein the instructions are further configured to cause the system to:

responsive to determining that the at least one aspect of the first monitoring query exceeds the threshold, assign a fifth portion of the application traffic to be routed to the previous stack.

16. A system for automatic traffic routing for transitioning application traffic between versions of an application, the system comprising:

one or more processors; and memory in communication with the one or more processors and storing instructions that, when executed by the one or more processors, are configured to cause the system to:

assign a first portion of application traffic to be routed to a new stack;

continuously monitor the application traffic by utilizing one or more monitoring systems; and utilize a machine learning model (MLM) to iteratively:

transmit one or more respective monitoring queries to each of the one or more monitoring systems;

determine whether at least one aspect of a first monitoring query of the one or more respective monitoring queries exceeds a threshold; and responsive to determining that the at least one aspect of the first monitoring query does not exceed the threshold:

assign a second portion of the application traffic to be routed to the new stack by modifying the first portion of the application traffic; and cease monitoring the application traffic, wherein the new stack comprises a different version of an application.

17. The system of claim 16, wherein the instructions are further configured to cause the system to:

receive, via a graphical user interface (GUI), user input, wherein assigning the first portion of the application traffic is responsive to receiving the user input.

18. The system of claim 16, wherein the first portion is determined by the MLM based on monitoring of live traffic flow to the application.

19. The system of claim 8, wherein the instructions are further configured to cause the system to:

utilize the MLM to classify negative client impact as a non-binary decision based on a tolerance for negative client impact determined from specific features of the application, overall traffic volumes, or historical data.

20. The system of claim 8, wherein the threshold is based on evaluating client impact associated with the application traffic routed to the new stack.

* * * * *